Figure 2A:
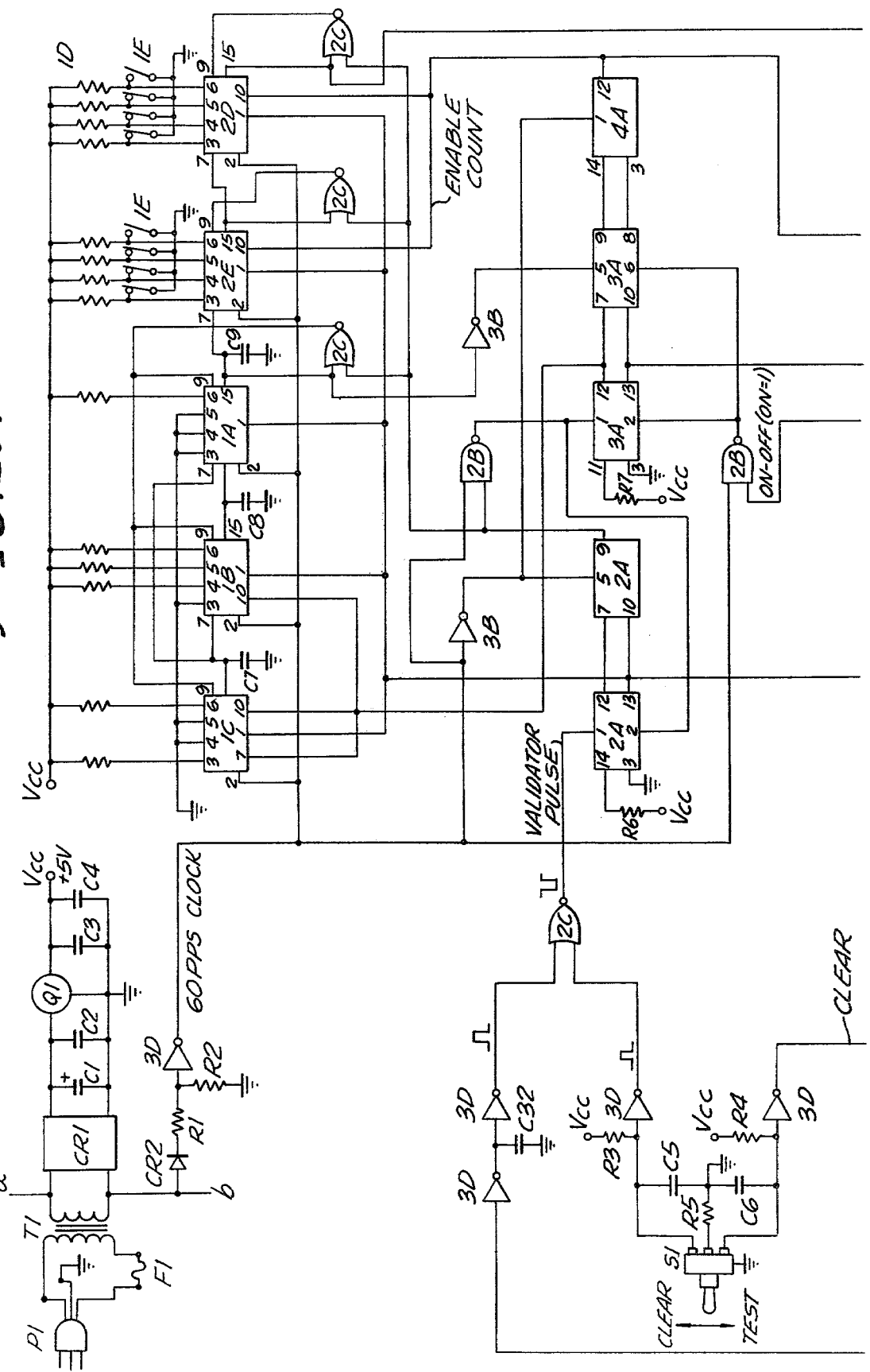

United States Patent [19]

Martin et al.

[11] 4,312,436
[45] Jan. 26, 1982

[54] VALIDATOR-CONTROLLED APPARATUS

[76] Inventors: Robert F. Martin, 18552 Valley Dr., Villa Park, Calif. 23415; Donald A. Eby, 23415 Caminito Lazaro, Laguna Hills, Calif. 92653; Donald L. Huebsch, 3716 Prestwick Dr., Los Angeles, Calif. 90027

[21] Appl. No.: 61,525

[22] Filed: Jul. 27, 1979

[51] Int. Cl.³ .............................................. G07F 5/10
[52] U.S. Cl. .................................. 194/4 R; 194/1 E; 194/9 T; 194/DIG. 18; 194/DIG. 20
[58] Field of Search ............... 194/1 E, 9 T, 11, 51, 194/59, 65, DIG. 18, DIG. 20, 4

[56] References Cited

U.S. PATENT DOCUMENTS

| | | | |
|---|---|---|---|
| 2,583,461 | 1/1952 | Arnett | 194/DIG. 20 |
| 3,064,787 | 11/1962 | Davis | 194/11 |
| 3,730,321 | 5/1973 | Akin | 194/9 T |
| 3,792,764 | 2/1974 | Kinoshita | 194/DIG. 20 |
| 3,828,905 | 8/1974 | Van Meter | 194/2 X |
| 3,923,134 | 12/1975 | Rezazadeh | 194/9 T |

Primary Examiner—Joseph J. Rolla
Attorney, Agent, or Firm—Sellers and Brace

[57] ABSTRACT

Validator-controlled apparatus responsive to the inspection and validation of a plaque as genuine cooperating with a timer to control the power supply to and operation of a plurality of electrical components for one or consecutive predetermined periods. In an illustrative application of the apparatus, the validator inspects and authenticates a coded plaque of paper currency or a coded card as a prerequisite to the control and use of a room for a measured period of time equipped with one or more electrical components. One of the controlled components is a lock for the room door or barrier which re-locks after entrance of the patron or patrons and remains locked from its exterior but is manually releasable from the interior at any time. The apparatus includes provision for disabling the plaque validator and the door lock during the decrement of an existing predetermined time period.

9 Claims, 4 Drawing Figures

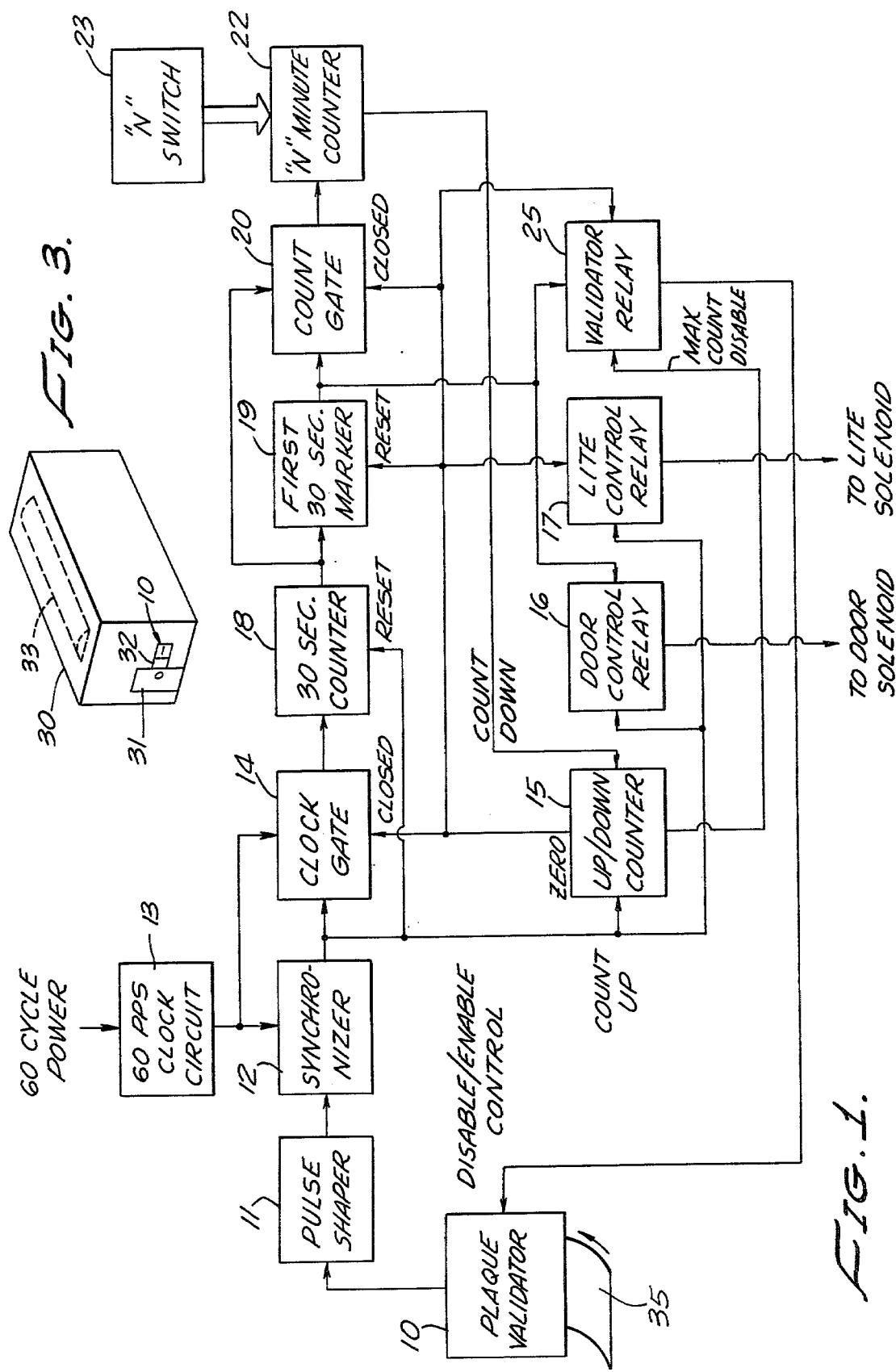

VALIDATOR-CONTROLLED APPARATUS

This invention relates to apparatus for controlling the use of a facility, and more particularly to apparatus of this type having means for inspecting and validating a plaque as genuine and thereupon to control one or more other components for single or consecutive time periods and for disabling the validator and the access control lock for use by others during that period.

BACKGROUND OF THE INVENTION

There have been numerous proposals over the years for monitoring and controlling the use of a wide variety of facilities without need for supervision by paid attendants. The following U.S. patents show such examples of devices as employed to control the use of electrical appliances: Lipp et al, No. 1,988,963; Seeburg, No. 2,038,963; Stark, No. 2,106,042; and Greenwold, No. 3,756,366.

Automatic devices actuated by the insertion of coins to control supervisory programmers for tennis playing equipment are disclosed by Mott U.S. Pat. No. 2,632,546; Rodwell et al, U.S. Pat. No. 3,645,370; and Petrini et al, U.S. Pat. No. 4,139,764.

The following U.S. patents disclose automatic coin operated devices for monitoring dry cleaning operations: Stone et al, No. 3,168,178; New, No. 3,191,738; and Kinoshita, No. 3,792,764.

Automated coin operated devices for supervising a vehicle parking facility are disclosed in: Wilcox, U.S. Pat. No. 3,370,686; Selby, U.S. Pat. No. 3,757,916; Singer, U.S. Pat. No. 3,815,718; and Malott, U.S. Pat. No. 4,031,991. Coin controlled devices for room facilities are shown in Rezazadeh, U.S. Pat. No. 3,923,134; and Vinet, U.S. Pat. No. 3,933,231.

Of the above patents, only Petrini, 4,139,764 has control apparatus responsive to the insertion of an item other than coins or tokens; instead Petrini inserts a specially constructed card bearing a concealed code which, if recognised by a monitoring device, functions solely to display a notice that the facility is in authorized use.

Control devices exemplified in the above listed patents and others have many shortcomings and disadvantages including complexity of the mechanical components, high initial and maintenance expense, need for quantities of coins of particular denominations to initiate operation, unsuitability for handling operations costing larger amounts, need for accessibility to currency changers or to cashiers to make change, and lack suitable means safeguarding attempts by third parties to gain access to the controlled facilities while in use. A particularly serious shortcoming is lack of a programming device actuable by currency or the like type of plaque possessed by persons authorized to use the facility.

SUMMARY OF THE INVENTION

This invention avoids the aforementioned and numerous other shortcomings and disadvantages of prior access control mechanisms. To this end the present invention utilizes a currency-type validator to inspect and check an item of currency or plaque incorporating encoded indicia or information capable of being authenticated by specially designed equipment and utilized to provide an output signal. This signal is then processed by timer means and utilised to control the power supply to one or more components for a predetermined period of time while concurrently disabling the validator and the control for the facility access for this time period. The timer includes means for delaying disablement of the validator for a selected period sufficient to permit insertion of one or more additional plaques in the validator and/or to permit the patron to enter the controlled facility as via a normally locked barrier or door. The controlled facility may be equipped with various power operated devices adapted to be energized during the predetermined period of use.

Accordingly, it is a primary object of this invention to provide a unique plaque-controlled programming apparatus.

Another object of the invention is the provision of validator controlled apparatus for a facility or the like permitting the use of the facility for a predetermined time upon the insertion and validation of one or more authentic plaques or items of currency.

Another object of the invention is the provision of a currency controlled validator operable to supply power to one or more components for a predetermined period upon insertion of one or more valid plaque thereinto within a preselected interval or series of overlapping intervals and for disabling the validator during the decrement of that predetermined period.

Another object of the invention is the provision of solid state plaque validating means operable to control access to an enclosure and the use of that enclosure for a predetermined time determined by the acceptance of one or more valid plaques including provision for disabling both the validator and a lock for the access to the enclosure during the period of use.

These and other more specific objects will appear upon reading the following specification and claims and upon considering in connection therewith the attached drawing to which they relate.

Figure 2B:
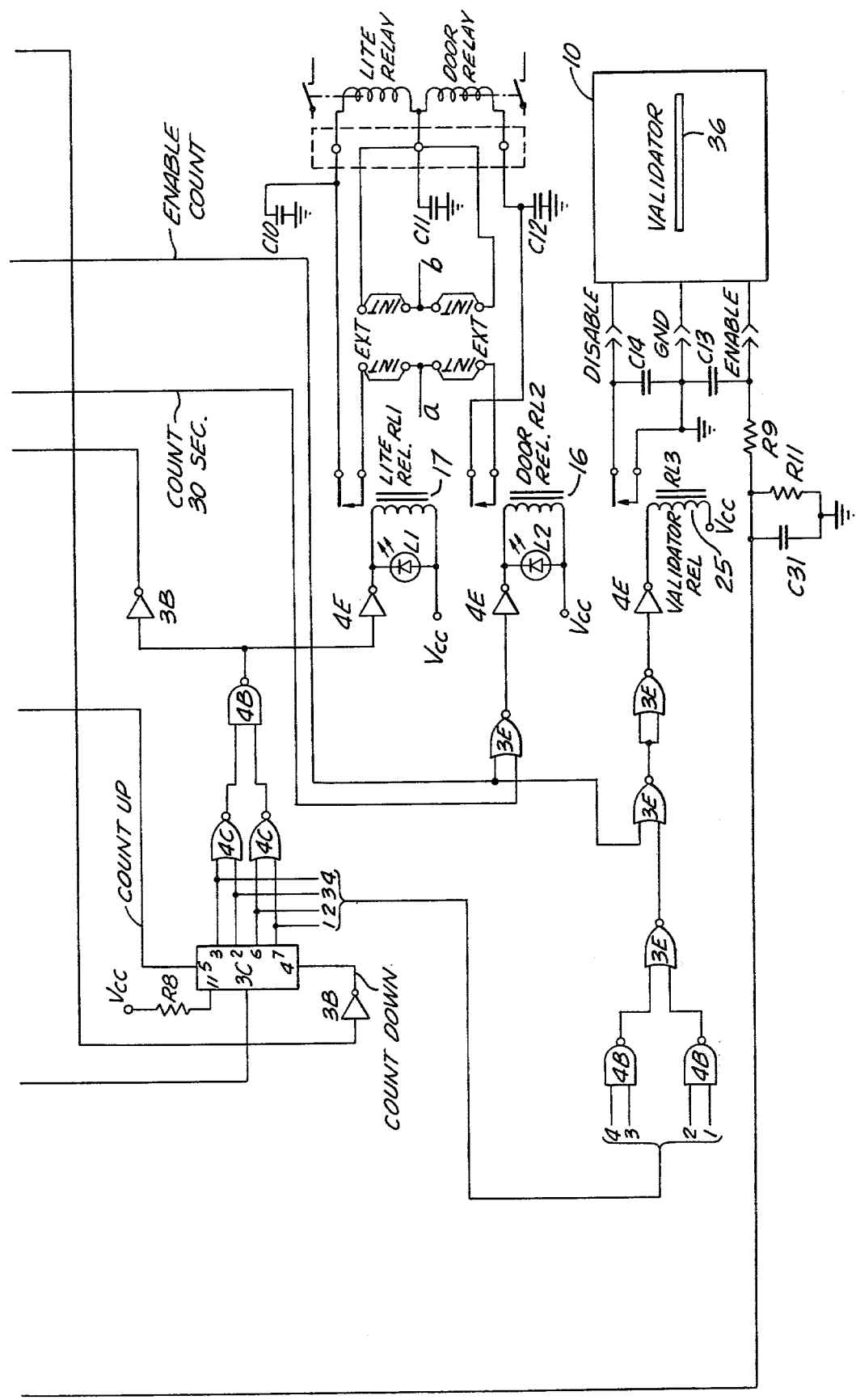

Referring now to the drawing in which a preferred embodiment of the invention is illustrated:

FIG. 1 is a block diagram showing an illustrative arrangement of the electronic components for use in a typical application of the validator controlled apparatus;

FIGS. 2(a) and 2(b) are an electrical schematic of the electronic components utilized in implementing the block diagram of FIG. 1; and FIG. 3 is a perspective view of the invention control applied to an enclosure.

Referring to FIG. 1, there is shown a simplified representation of the invention utilizing a suitable plaque validator 10 such, for example, as those shown in U.S. patents to Bayha Nos. 3,419,724; 3,436,552; 3,360,653; 3,606,941 and Petrini No. 4,139,764. The Bayha patents disclose validator constructions specially designed to authenticate and validate an item of currency whereas the Pentrini patent discloses a validator of the type providing an output signal upon authenticating a card or the like bearing coding information. It will be understood that these and similar known validators function to provide an output signal if the inserted plaque is found authentic. Accordingly, it is unnecessary to encumber this disclosure with these known details.

Preferably, the output signal of the validator 10 passes through a pulse shaper 11 to remove spikes and improve its shape following which the signal is introduced to a synchroniser 12 and synchronised with one of the 60 pulses per second derived from a continuously operating 60 pps clock 13.

The resulting output signal from synchroniser 12 is conducted to a clock gate 14, to up/down counter 15, to the underlying or reset terminal of the 30 second counter 18 to reset that counter to start counting from zero and to one or more power utilization accessories as, for example, a door control relay 16 and a light control relay 17. It will be recognized that additional power utilization devices may also be connected in circuit with the output signal from synchronizer 12. The input to 14 from synchronizer 12 operates to open gate 14 and channel the 60 pps from clock 13 into counter 18.

Counter 18 issues a pulse every 30 seconds unless its timing cycle is interrupted by a reset signal issuing from synchronizer 12, an event occuring only if the patron should insert an additional plaque into validator 10 in order to gain the use of the controlled facility for an additional period of time. In this circumstance a further impulse is received by counter 18 to reset it for a new 30 second timing period, and the up/down counter 15 is incremented upward for another period.

When counter 18 times out for a full 30 seconds, it dispenses a pulse and continues to dispense a pulse every 30 seconds until clock gate 14 is closed which does not occur until up/down counter 15 is decremented to zero at the end of the complete time period purchased by the patron. The first 30 second pulses issuing from counter 18 is recognized by marker 19 and causes count gate 20 to open and channel subsequent 30 second pulses into the "N" minute counter 22. The recognition of the first pulse from counter 18 by marker 19 also causes the door relay 16 to deactivate that relay thereby relocking the door to outsiders without however interfering with reopening the door by a patron inside the enclosure. Additionally the recognition of the first pulse from counter 18 by marker 19 causes the validator relay 25 to disable the validator thereby rendering that device unusable to accept plaques without which no one can purchase time or gain entrance or access to the facility.

Once count gate 20 opens, the "N" minute counter 22 continues to receive 30 second pulses from counter 18 until it is closed by up/down counter 15 when it is decremented to zero. The "N" minute counter 22 provides a use pulse output for time period multiples of 30 seconds. The opening between these period of use pulses is determined by the setting of the "N" switch 23 of a type well known commercial type manually settable and cooperable with counter 22 to cause the latter to issue pulses at any desired interval alloted for each plaque validated by validator 10. These pulses are utilized in up/down counter 15 to decrement this counter by the exact number of pulses received from the validator. Accordingly at the end of the total period of use purchased, counter 15 decrements to zero and omits a signal serving several purposes, namely, to close clock gate 14 thereby stopping the 60 pps signals to counter 18; resets marker 19 to its initial condition; deactivates the light control relay 17; and enables validator 10 for use by the next patron. Thus the system is now fully reconditioned for the next operating cycle. It will be understood that the up/down counter has a finite capacity or time limit it is capable of handling. If a patron should insert enough plaques 35 in succession to reach this limit, the counter automatically releases a signal from its lower side back to the validator relay 15 to disable plaque validator 10 from receiving additional plaques whereupon the patron should proceed to use the facility fortthe time he has then purchased.

From the foregoing, it will be recognized that our plaque controlled system can be used to control any of a great variety of facilities. By way of example, FIG. 3 shows the invention control installed at the entrance of an enclosure 30 such as an athletic facility having an entrance door 31 normally maintained locked under the control of a solenoid 32 in circuit with the door control relay 16 the door being manually openable at will by a person on the interior side of the door. As shown, the door lock is positioned beside plaque validator 10 which is fixed to the enclosure and arranged to dispense all validated plaques into a safe box (not shown) interiorly of the enclosure 30.

Referring now to FIGS. 2a and 2b there is shown a detailed schematic of the essentially solid state components represented in simplified form in the block diagram of FIG. 1. The major portion of these components are embodied in the integrated circuit components readily available commercially. These components are more precisely identified in Table I beginning at the upper left hand corner of FIG. 2a and continuing in horizontal layers to the bottom of FIG. 2b.

TABLE I

| Components | Description |
| --- | --- |
| P1 | Power Cord, Beldon 17236 |
| F1 | Fuse Holder, Newark Stock No. 27F855 with ¼ amp-250v, type AGC |
| T1 | Filament Transformer, Triad F-31X |
| CR1 | Bridge Rectifier, Motorola MDA 942A1 |
| Q1 | Voltage Regulator T.I. 7805 CKC |
| C1 | Capacitor, 2700 mfd, 25 VOC Sprague 36 D 277 GO 25 AA |
| C2,3,9,10,11,12,13, 14,31,32 | Capacitor 0.1 mfd, 50 VDC Ceramic Sprague 3C 5U104 × 005065 |
| C4,5,6 | Capacitor, 10mfd, 10 VDC, Tantalum Sprague 1500106 × 0010A3 |
| CR2 | Diode, 1914 |
| R1 | Resistor, 2K ohm, ¼ watt |
| R2 | Resistor, 750 ohm, ¼ watt |
| 3D | IC, Hex Schmitt Trigger 7414N |
| 1D | DIP Resistor Pack, 15 × 3.3 K ohm, Beckman |
| 1E | 8 Pos. DIP Switch, Amp 7638 |
| C7,8, | Capacitor, .01 mfd, 50 VDC Ceramic |
| 1A,1B,1C,2D,2E | I.C. Synchronous 4 bit binary counter 74161N |
| 2C,4C,3E | I.C. Quadruple 2-input positive NOR Gate 74QN |
| 3B | I.C. Hex inverter 7404N |
| 2B,4B | I.C. Quadruple 2-input positive NAND Gate 7414N |
| 2A,3A,4A | I.C. Dual JK master-slave flip flop 7473N |
| S1 | SPDT Momentary Switch C & D 7105 + MD9A |
| R3,4,6,7,8,9 | Resistor, 3K ohm, ¼ watt |
| R5 | Resistor, 100 ohm, ¼ watt |
| R11 | Resistor, 1500 ohm, ¼ watt |
| 3C | I.C. Synchronous 4-bit binary up/down counter with preset inputs 74193 N |
| 4E | I.C. Hex inverter buffer/drive 7416N |
| L1, L2 | LED, Dialco No. 555-2003 |
| RL-1, RL-2, RL-3 | Play Magnicraft W 171 Dip L |

As will be recognized, the power supply enters through transformer T1 and energizes the power supply unit CR1 to generate a source of 5 volts DC for the electronic components. Prior to entering the power supply leads a, b branch off to energize the light relay and the door lock relay. All other components are driven from the output of the D.C. power supply. Plaque validator 10 is located in the lower right hand corner of FIG. 2b and when this unit is enabled its output enters the synchronizer and the pulse shaper in the lower left corner of FIG. 2a. Appropriate legends have been applied liberally to both of these figures to aid interpretation of the schematic.

OPERATION

Let it be assumed that patrons desire to use facility 30 for two consecutive periods the charge for which is one dollar per period. If validator 10 is designed to authenticate one dollar bills 35 rather than an encoded card plaque having a value of one dollar, the patron makes two one dollar bills in readiness for sequential insertion in slot 36 of validator 10. The first bill is then inserted in the validator slot 36 whereupon the validator functions immediately in known manner to inspect the bill for authenticity. If the inspection is favorable, the validator emits a characteristic pulse to shaper 11 which sharpens and shapes the pulse. This pulse is transmitted to synchronizer 12 where it is modulated with the 60 pulses per second entering synchrinizer 12 from the 60 pps clock circuit 13. While this is occuring, the authenticated bill is dispensed and retained captive in a storage receptacle or place of safekeeping concealed within facility 30.

The modulated signal emanating from synchronizer 12 performs four functions, namely, it re-sets the 30 second counter 18 to zero to initiate a 30 second counting cycle for that counter, it increments the up/down counter 15 upwardly one unit, and additionally it activates the door control relay 16 to unlock the door and the light control relay 17 to turn on the facility lights. Since clock gate 14 is now open, the 60 pps signal enters and activates the 30 second counter 18 which generates an output pulse only if permitted to operate for a full 30 second cycle. However, if the patron inserts his second bill in the validator and that unit completes the authentication of the bill before expiration of a 30 second cycle of counter 18, a new output signal from the validator will be transmitted to counter 18 to reset that counter to zero. This reset signal will also pass to the up/down counter 15 and increment that counter upwardly one more unit. The door lock remains released and the lights remain on in the facility.

Following the insertion of the second bill, counter 18 will time out and release a pulse to marker 19 and count gate 20. The pulse to marker 19 activates that unit allowing the 60 pps signal to open count gate 20. Also at the time the pulse signal issuing from marker 19 is transmitted to the door lock relay 16 to disable that relay and to the validator relay 25 to disable validator 10 so that no one else can insert bills into the validator during the two periods just purchased by the patron. The patrons who inserted the two bills have 30 seconds beginning with the insertion of the last bill within which to enter door 31 since the door re-locks at the end of the last 30 second cycle of counter 18 which immediately operates marker 19 to lock the door.

The 30 second pulses from counter 18 now enter the "N" minute counter 22 via count gate 20 which functions to emit period counting pulses having a duration determined by the setting of the "N" switch 33. Since two bills have been inserted, "N" counter 22 will release a first count signal to decrement the up/down counter 15 down one period and will thereafter release a second pulse to decrement counter 15 downwardly a second time. As this counter returns to its initial zero point it automatically releases a signal to reset components 14, 17, 19, 20 and 25. Thus it closes gate 14 to cut off all timing pulses from clock 13, disables light control relay 17 and resets marker 19 to the initial condition, closes count gate 20, and enables the validator control relay and the validator in readiness to accept a bill from the next patron.

While the particular validator-controlled apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. Mechanism for controlling the use of a facility for a predetermined time period in response to receipt and authentication of a valid encoded plaque comprising:

inspection and validator means operable to inspect an encoded plaque of paper currency and to provide an output signal in response to inspection and authentication of a plaque of paper currency;

electronic timer means activated by said output signal and operable to measure a plurality of time periods of different preselected duration;

a plurality of power operated components; means connecting said timer means, said inspection and validator means and said power operated components in circuit for use for a respective one of said predetermined time periods upon receipt of an output signal from said plaque inspection and validator means; and means for disabling said plaque inspection and validator means to receive another plaque during the decrement of an activated predetermined time period and including means for delaying the operation of said disabling means for a short period thereby to provide time for the insertion and processing of an additional plaque into said plaque inspection and validating means.

2. Mechanism as defined in claim 1 characterized in that said power components include means normally disenabling said mechanism for use except during the decrement of a relatively long predetermined time period initiated by at least one output signal from said plaque validator means.

3. Mechanism as defined in claim 1 characterized in that said validator disenabling means includes means for delaying the operation of said disabling means for successive short periods thereby to permit insertion and processing of successive plaques so long as a plaque insertion occurs during the decrement of the associated one of said short periods.

4. Mechanism as defined in claim 3 characterized in the provision of means for reenabling said plaque validator means after the complete decrement of a relatively long one of said different predetermined time periods initiated by said output signal.

5. Mechanism as defined in claim 3 characterized in the provision of means for reenabling said plaque validator means after completion of the decrement of the sum of the relatively long predetermined time period initiated by each of a plurality of valid plaques.

6. Mechanism as defined in claim 1 characterized in that said power components include electrically operated locking means.

7. Mechanism as defined in claim 6 characterized in that said locking means is in the locking position thereof when not energized.

8. Mechanism as defined in claim 6 characterized in that said timer means includes means for maintaining said locking means energized and unlocked during said relatively short predetermined period following receipt of a valid plaque by said plaque inspection and validation means.

9. Mechanism as defined in claim 8 characterized in that said timer means includes means for limiting the energization of said locking means to a small fraction of the period during which power is supplied to other of said power operated components.

* * * * *